US011350429B2

(12) United States Patent
Ulupinar et al.

(10) Patent No.: US 11,350,429 B2
(45) Date of Patent: May 31, 2022

(54) QUALITY OF SERVICE TECHNIQUES FOR QUIC STREAMS

(71) Applicant: QUALCOMM Incorporated, San Diego, CA (US)

(72) Inventors: Fatih Ulupinar, San Diego, CA (US); Peerapol Tinnakornsrisuphap, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 131 days.

(21) Appl. No.: 16/781,775

(22) Filed: Feb. 4, 2020

(65) Prior Publication Data
US 2021/0243774 A1 Aug. 5, 2021

(51) Int. Cl.
G06F 11/00 (2006.01)
H04W 72/12 (2009.01)
H04L 69/22 (2022.01)
H04W 28/02 (2009.01)
H04W 76/11 (2018.01)

(52) U.S. Cl.
CPC ......... H04W 72/1231 (2013.01); H04L 69/22 (2013.01); H04W 28/0268 (2013.01); H04W 76/11 (2018.02)

(58) Field of Classification Search
CPC ... H04L 47/10; H04L 47/2441; H04L 47/215; H04L 47/20
USPC .............................................. 370/235, 235.1
See application file for complete search history.

(56) References Cited

U.S. PATENT DOCUMENTS

| 7,472,205 | B2* | 12/2008 | Abe ...................... H04L 69/163 710/25 |
| 2003/0067903 | A1 | 4/2003 | Jorgensen |
| 2018/0109503 | A1* | 4/2018 | Nadas ................ H04L 63/0428 |
| 2018/0183724 | A1 | 6/2018 | Callard et al. |
| 2018/0367288 | A1* | 12/2018 | Vrzic ............... H04W 36/0069 |
| 2019/0149516 | A1* | 5/2019 | Rajahalme ............. H04L 69/22 370/392 |
| 2019/0199835 | A1* | 6/2019 | Deval ................... H04L 69/326 |
| 2019/0268797 | A1* | 8/2019 | Pang ....................... H04L 47/28 |
| 2019/0320479 | A1 | 10/2019 | Choudhary et al. |
| 2019/0363843 | A1* | 11/2019 | Gordaychik ......... H04L 1/1854 |
| 2019/0364557 | A1* | 11/2019 | Harada ................. H04W 28/04 |
| 2020/0008120 | A1* | 1/2020 | Beck ..................... H04W 76/11 |
| 2020/0008254 | A1* | 1/2020 | Beck ....................... H04W 4/80 |
| 2020/0259763 | A1* | 8/2020 | Guim Bernat ...... H04L 41/0896 |

(Continued)

OTHER PUBLICATIONS

International Search Report and Written Opinion—PCT/US2021/012427—ISA/EPO—dated Apr. 19, 2021.

Primary Examiner — Chuong T Ho
(74) Attorney, Agent, or Firm — Norton Rose Fulbright LLP

(57) ABSTRACT

Wireless communication techniques that include QoS techniques for scheduling transmission of QUIC streams in a wireless communication system are discussed. A wireless communication device may receive a data packet having a header that includes a first plurality of fields. The wireless communication device may also schedule transmission of the data packet based on QoS parameters associated with the first plurality of fields. The transmission of the data packet may be scheduled based on QoS parameters associated with the first plurality of fields when the first plurality of fields match a second plurality of fields. Other features are also described.

24 Claims, 7 Drawing Sheets

(56) References Cited

U.S. PATENT DOCUMENTS

| | | | |
|---|---|---|---|
| 2020/0260134 A1* | 8/2020 | D'Acunto | H04L 65/80 |
| 2020/0359264 A1* | 11/2020 | Racz | H04W 28/0967 |
| 2021/0112006 A1* | 4/2021 | Francini | H04L 47/12 |
| 2021/0144096 A1* | 5/2021 | Plat | H04L 47/20 |

* cited by examiner

QUALITY OF SERVICE TECHNIQUES FOR QUIC STREAMS

TECHNICAL FIELD

Aspects of the present disclosure relate generally to wireless communication systems, and more particularly, to quality of service (QoS) techniques for scheduling transmission of QUIC streams in a wireless communication system. Certain embodiments of the technology discussed below can enable and provide enhanced communication features and techniques for communication systems, including high data rates, high capacity, high performance, high reliability, low latency, low complexity, low memory usage, and low power device operations.

INTRODUCTION

Wireless communication networks are widely deployed to provide various communication services such as voice, video, packet data, messaging, broadcast, and the like. Wireless networks may be multiple-access networks capable of supporting multiple users by sharing available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include receiving a data packet having a header that includes a first plurality of fields. The method can also include scheduling transmission of the data packet based on QoS parameters associated with the first plurality of fields. The transmission of the data packet may be scheduled based on QoS parameters associated with the first plurality of fields when the first plurality of fields match a second plurality of fields.

In another aspect of the disclosure, an apparatus configured for wireless communication is provided. For example, the apparatus can include means for receiving a data packet having a header that includes a first plurality of fields. The apparatus can also include means for scheduling transmission of the data packet based on QoS parameters associated with the first plurality of fields. The transmission of the data packet may be scheduled based on QoS parameters associated with the first plurality of fields when the first plurality of fields match a second plurality of fields.

In an additional aspect of the disclosure, a non-transitory computer-readable medium having program code recorded thereon is provided. The program code can include program code executable by a computer for causing the computer to receive a data packet having a header that includes a first plurality of fields. The program code can also include program code executable by a computer for causing the computer to schedule transmission of the data packet based on QoS parameters associated with the first plurality of fields. The transmission of the data packet may be scheduled based on QoS parameters associated with the first plurality of fields when the first plurality of fields match a second plurality of fields.

In another aspect of the disclosure, an apparatus configured for wireless communication is provided. The apparatus includes at least one processor, and a memory coupled to the processor. The at least one processor can be configured to receive a data packet having a header that includes a first plurality of fields. The at least one processor can also be configured to schedule transmission of the data packet based on QoS parameters associated with the first plurality of fields. The transmission of the data packet may be scheduled based on QoS parameters associated with the first plurality of fields when the first plurality of fields match a second plurality of fields.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
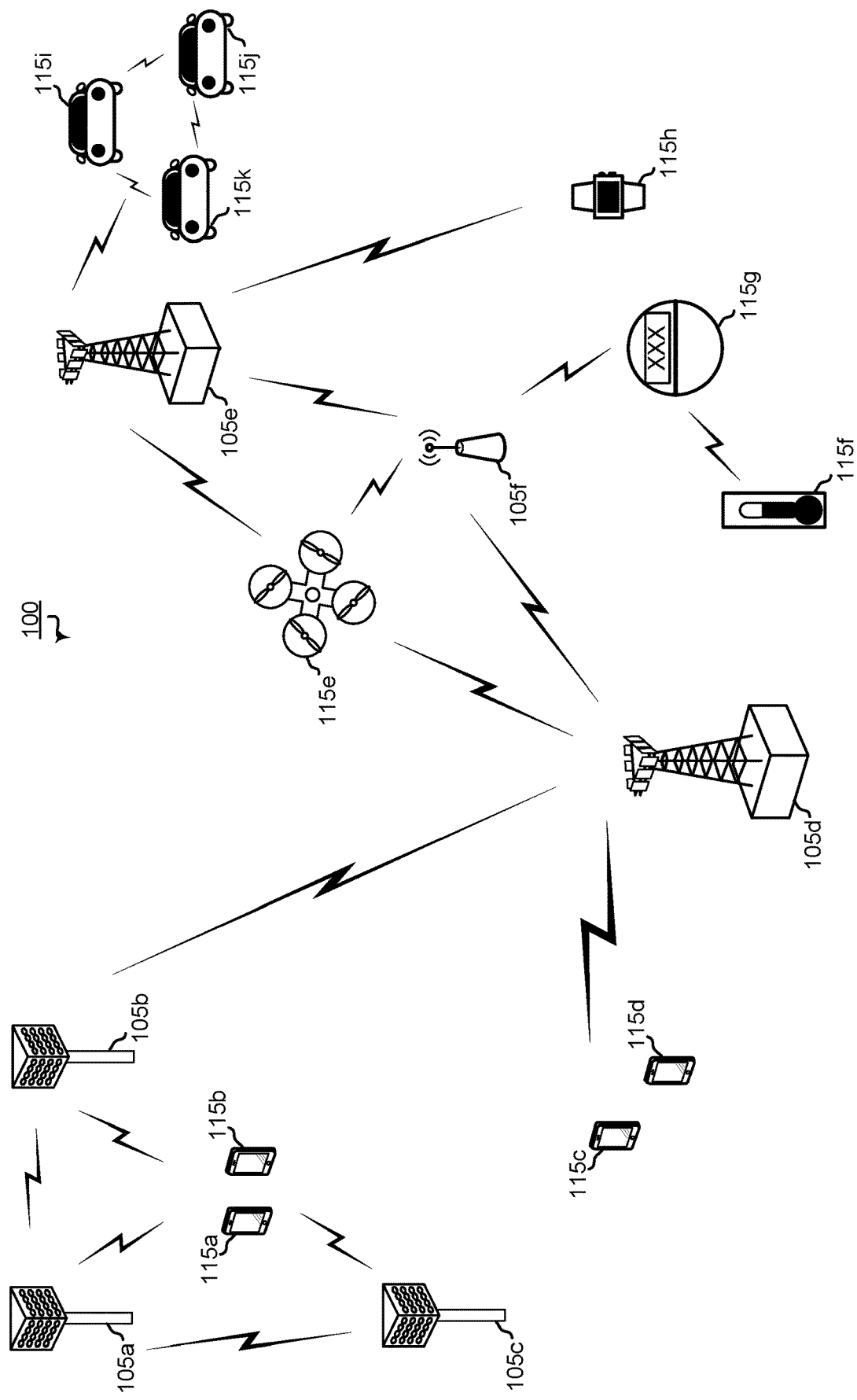
FIG. 1 is a block diagram illustrating details of a wireless communication system according to some aspects of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

As mentioned, this disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. A 5G NR system may be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatuses, and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations. In this fashion networks may employ varying usage of a variety of timing/frequency arrangements.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
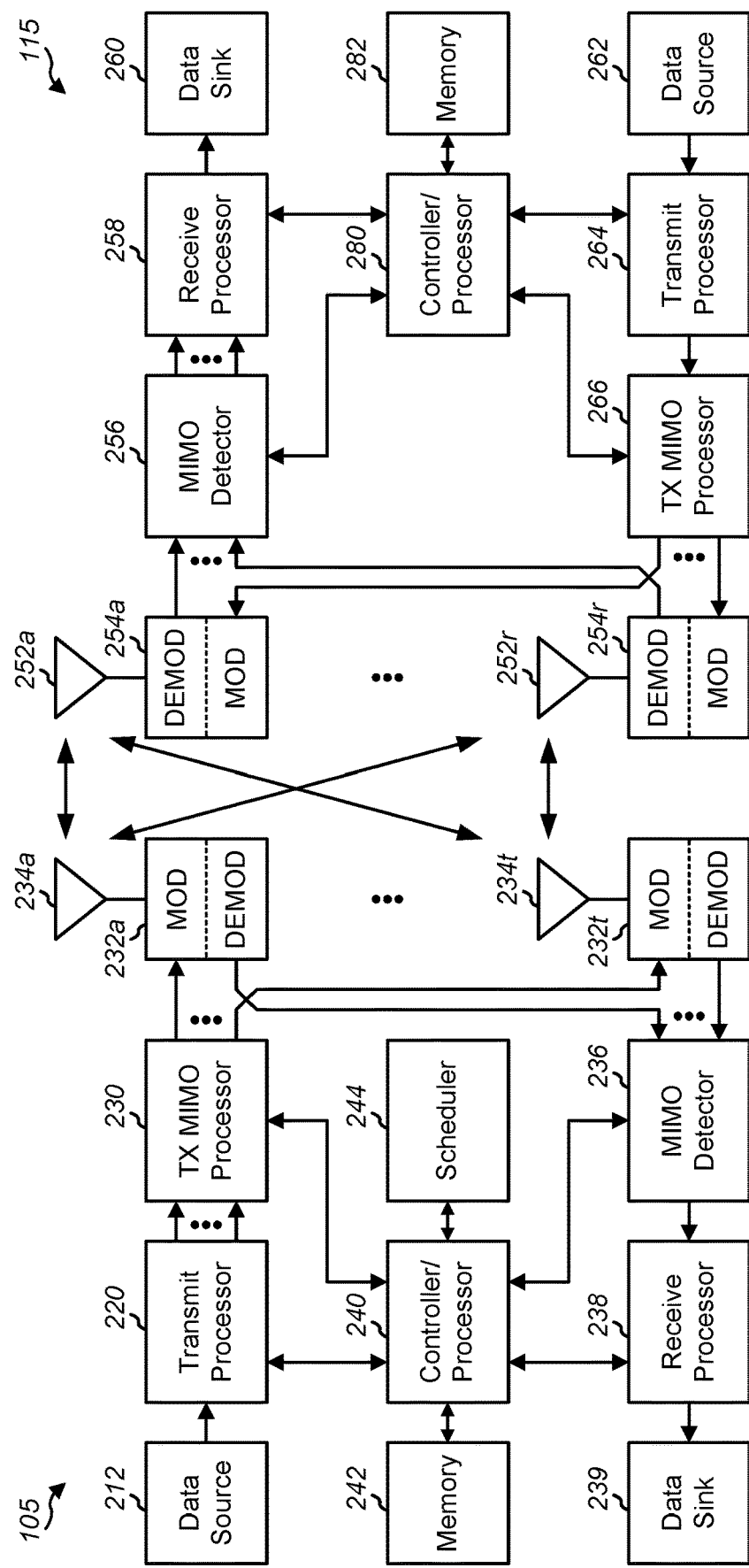
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIG. 3, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band. The shared RF spectrum band can include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Wireless communication devices, such as base station 105 and/or UE 115, may use various protocols at various layers to perform wireless communication. For example, an Internet Protocol (IP) may be used to provide Internet connectivity, and a Transmission Control Protocol (TCP) or a User Datagram Protocol (UDP) may be used to provide actual connectivity between devices and to provide the associated port numbers. A Transport Layer Security (TLS) protocol may be used to provide security. In addition, an application running on or in a wireless communication device may use an application protocol, such as, for example, the Hypertext Transfer Protocol (HTTP), HTTP/2 protocol, and/or HTTP/3 protocol, to format, get, send, input, and/or output content. An application may refer to any type of application, such as, for example, a mobile application, desktop application, software program, widget, machine-learning application, and/or web application. Content may refer to any content that can be transmitted wirelessly, such as, for example, images, text, and/or video. Some deployments may involve content distribution by a content provider for use and/or receipt by end-user devices (e.g., UEs and/or base stations). The foregoing protocols are just examples, and are therefore not intended to limit the scope of this disclosure. In particular, various other protocols at various other layers may also be used to provide the same, or additional, functionality as the functionality described above.

In some aspects of the disclosure, a wireless communication device may use a QUIC protocol to perform wireless communication. The QUIC protocol described herein may refer to the QUIC transport protocol described and standardized by the Internet Engineering Task Force (IETF). According to an aspect of the disclosure, the QUIC protocol may be a UDP-based multiplexed and secure transport protocol. In some aspects of the disclosure, the QUIC protocol may provide various functionality typically provided by various protocols, such as, for example, the aforementioned TCP, UDP, TLS, and/or various HTTP-based protocols.

Content from applications may be transmitted and/or received, e.g., using various protocols, as one or more data packets. That is, a data packet may include a subset, or all, of the content data from an application, typically referred to as the payload of the data packet. In addition to the payload, a data packet may also include a header. The header may include control information organized and placed in various information fields of the header. The control information in the information fields of the header may provide the information needed by a wireless communication device to transmit, receive, and/or process the payload. A data packet as described herein may also be referred to, by one of ordinary skill in the art, as a flow or a stream. Thus, a data packet compliant with the QUIC protocol may also be referred to herein interchangeably as a QUIC packet, QUIC flow, or QUIC stream.

A data packet compliant with the QUIC protocol, e.g., a QUIC stream, may have various advantage features. For example, most fields of a QUIC header may be encrypted. In some aspects of the disclosure, some fields of the QUIC header may not be encrypted, such as the Connection ID field. According to an aspect of the disclosure, a Connection ID field of a QUIC stream header may be used to multiplex multiple streams. In another aspect of the disclosure, one QUIC stream may not block the transmission of another QUIC stream. In some aspects of the disclosure, a QUIC stream may be added and/or removed independent of another QUIC stream. In another aspect of the disclosure, a QUIC stream may be dependent on another QUIC stream such that removal of one QUIC stream, e.g., a parent QUIC stream, may necessitate the removal of another QUIC stream, e.g., a child QUIC stream. According to an aspect of the disclosure, each QUIC stream and/or QUIC connection may be scheduled for transmission independent of each other. In another aspect of the disclosure, the scheduling of transmission of a QUIC stream may be dependent on the scheduling of transmission of another QUIC stream.

In some aspects of the disclosure, a wireless communication device may prioritize and/or schedule the transmission of data packets based on QoS parameters associated with the data packets. Generally, QoS may refer to the ability to provide different priority to different applications, users, and/or streams, or to guarantee a certain level of performance to a stream. As an example, in some aspects of the disclosure, some QoS parameters may specify data rate, delay, delay variation, packet loss, and/or bit error rate (BER) thresholds, acceptable values, and/or acceptable ranges of values for a data packet.

Figure 3:
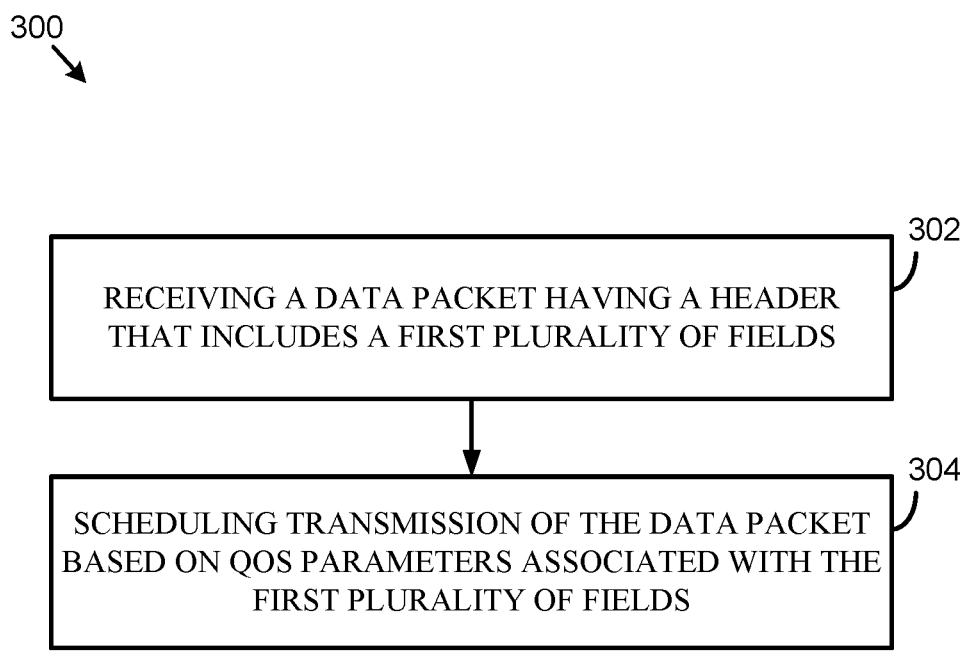
FIG. 3 is a block diagram illustrating a method for QoS-based transmission scheduling of QUIC streams in a wireless communication system according to some aspects of the present disclosure.

FIG. 3, as an example, is a block diagram illustrating a method for QoS-based transmission scheduling of QUIC streams in a wireless communication system according to some aspects of the present disclosure. Aspects of method 300 may be implemented with various other aspects of this disclosure described with respect to FIGS. 1-2 and 4-7, such as a mobile device/UE or a base station/gNB. For example, with reference to FIG. 2, controller/processor 240 of base station 105 may control base station 105 to perform method 300. As another example, with reference to FIG. 2, controller/processor 280 of UE 115 may control UE 115 to perform method 300. In yet another example, aspects of the disclosure may be performed by content providers.

Figure 6:
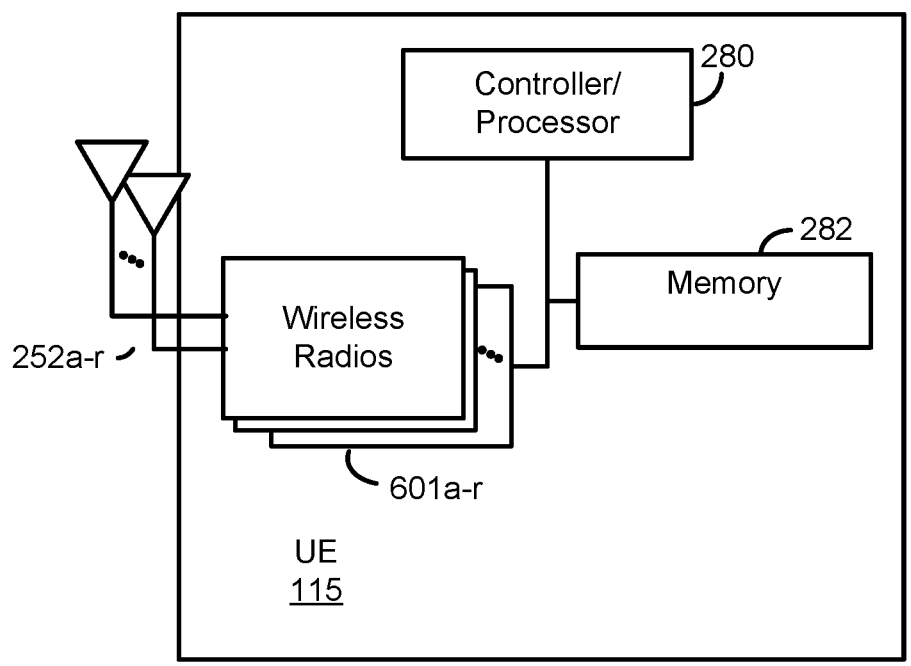
FIG. 6 is a block diagram illustrating a UE configured according to some aspects of the present disclosure.
Figure 7:
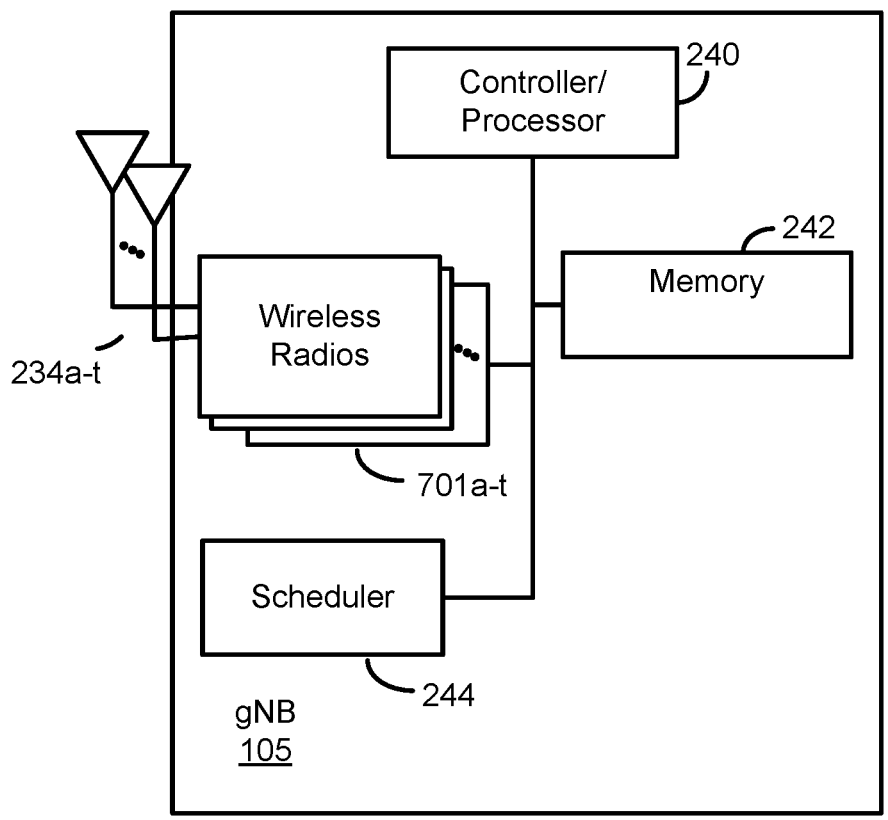
FIG. 7 is a block diagram illustrating a base station (e.g., a gNB) configured according to some aspects of the present disclosure.

The example blocks of method 300 will also be described with respect to UE 115 as illustrated in FIG. 6 and with respect to base station 105 as illustrated in FIG. 7. FIG. 6 is a block diagram illustrating UE 115 configured according to one aspect of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 601$a$-$r$ and antennas 252$a$-$r$. Wireless radios 601$a$-$r$ include various components and hardware, as illustrated in FIG. 2 for UE 115, including modulator/demodulators 254$a$-$r$, MIMO detector 256, receive processor 258, transmit processor 264, and TX MIMO processor 266. FIG. 7 is a block diagram illustrating base station 105 configured according to one aspect of the present disclosure. Base station 105 may include various structures, hardware, and components, such as those illustrated for base station 105 of FIG. 2. For example, base station 105 includes controller/processor 240, which operates to execute logic or computer instructions stored in memory 242. The controller/processor 240 can also control components of base station 105 that provide features and functionality of base station 105. Base station 105, under control of controller/processor 240, transmits and receives signals via wireless radios 701$a$-$t$ and antennas 234$a$-$t$. Wireless radios 701$a$-$t$ include various components and hardware, as illustrated in FIG. 2 for base station 105, including modulator/demodulators 232$a$-$t$, MIMO detector 236, receive processor 238, transmit processor 220, and TX MIMO processor 230. The controller/processor 280 and/or the controller/processor 240 can be provided with digital signals obtained from sampling received analog wireless signals for purposes of controlling communication operations.

FIG. 3 illustrates a method 300 that may be performed by a wireless communication device, such as a base station 105 or a UE 115. Method 300 includes, at block 302, receiving a data packet. The data packet may have a header that includes a first plurality of fields. As an example, base station 105 may, under control of controller/processor 240, receive a data packet having a header that includes a first plurality of fields. With specific reference to FIG. 2, in some aspects of the disclosure, a means for receiving a data packet having a header that includes a first plurality of fields may include the base station 105, and more specifically the components of the base station 105, such as, for example, controller/processor 240 and components of the base station 105 that are controlled/directed by controller/processor 240 to cause the base station 105 to receive a data packet having a header that includes a first plurality of fields. As another example, UE 115 may, under control of controller/processor 280, receive a data packet having a header that includes a first plurality of fields. With specific reference to FIG. 2, in some aspects of the disclosure, a means for receiving a data packet having a header that includes a first plurality of fields may include the UE 115, and more specifically the components of the UE 115, such as, for example, controller/processor 280 and components of the UE 115 that are controlled/directed by controller/processor 280 to cause the UE 115 to receive a data packet having a header that includes a first plurality of fields.

A wireless communication device may receive the data packet, such as at block 302, in a variety ways. For example, in one aspect of the disclosure, the wireless communication device may obtain the data packet having the header that includes the first plurality of fields from an application running within the wireless communication device. As another example, an application running within the wireless communication device may generate, or cause to be generated, a data packet having the header that includes the first plurality of fields. Thus, the wireless communication device may obtain the data packet from an application within the wireless communication device that generated the data packet or that caused the data packet to be generated.

In another aspect of the disclosure, the wireless communication device may receive the data packet, such as at block 302, from another wireless communication device. For example, in one aspect of the disclosure, a first wireless communication device may transmit a data packet having a header that includes a first plurality of fields. Then a second wireless communication device may receive the transmitted data packet having the header that includes the first plurality of fields.

In some aspects of the disclosure, a wireless communication device may determine whether the first plurality of fields match a second plurality of fields. According to some aspects of the disclosure, the second plurality of fields may refer to information fields of a header that uniquely identify a data packet. As an example, base station 105 may, under control of controller/processor 240, determine whether the first plurality of fields match a second plurality of fields. With specific reference to FIG. 2, in some aspects of the disclosure, a means for determining whether the first plurality of fields match a second plurality of fields may include the base station 105, and more specifically the components of the base station 105, such as, for example, controller/processor 240 and components of the base station 105 that are controlled/directed by controller/processor 240 to cause the base station 105 to determine whether the first plurality of fields match a second plurality of fields. As another example, UE 115 may, under control of controller/processor 280, determine whether the first plurality of fields match a second plurality of fields. With specific reference to FIG. 2, in some aspects of the disclosure, a means for determining whether the first plurality of fields match a second plurality of fields may include the UE 115, and more specifically the components of the UE 115, such as, for example, controller/processor 280 and components of the UE 115 that are controlled/directed by controller/processor 280 to cause the UE 115 to determine whether the first plurality of fields match a second plurality of fields.

According to some aspects of the disclosure, the second plurality of fields may refer to information fields of a header that uniquely identify a data packet or group of data packets. A data packet uniquely identified may refer to a data packet that is unique from other data packets. In some aspects of the disclosure, a group of data packets may be uniquely identified together. Thus, in another aspect of the disclosure, unique identification may also refer to the identification of a group of data packets that are processed similarly and uniquely identified from other data packets not part of the uniquely identified group of data packets. In yet other aspects of the disclosure, unique identification may refer to unique identification of a user of a wireless communication device, unique identification of a transmitter and/or receiver of a wireless communication device, and/or unique identification of content.

According to some aspects of the disclosure, the second plurality of fields may refer to a reference plurality of fields. In some aspects of the disclosure, a wireless communication device may compare the first plurality of fields to a reference plurality of fields to determine whether the first plurality of fields matches the reference plurality of fields. Thus, in some aspects of the disclosure, the wireless communication device determining whether the first plurality of fields matches a second plurality of fields may include the wireless communication device determining whether the first plurality of fields match a reference plurality of fields.

Figure 4:
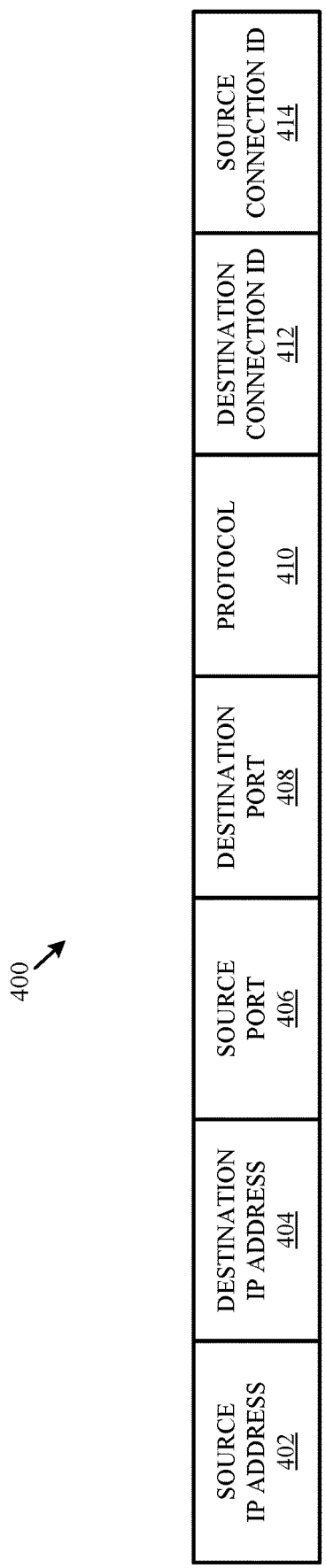
FIG. 4 shows a diagram that illustrates a plurality of fields of a data packet header according to some aspects of the present disclosure.

FIG. 4, as an example, shows a diagram that illustrates a plurality of fields 400 of a data packet header according to some aspects of the present disclosure. In one aspect of the disclosure, the plurality of information fields 400 illustrated in FIG. 4 may correspond to a reference plurality of fields, e.g., the second plurality of fields.

In the example illustrated in FIG. 4, the plurality of information fields 400 that uniquely identify a data packet may include separate fields to indicate a Source IP address 402, a Destination IP address 404, a Source Port 406, a Destination Port 408, a Protocol Identification (ID) 410, a Destination Connection ID 412, and a Source Connection ID 414. As shown in the example illustrated in FIG. 4, the plurality of information fields 400 that uniquely identify a data packet may include seven information fields. In some aspects of the disclosure, the seven information fields 400 may be referred to as a 7-tuple. Thus, in some aspects of the disclosure, a data packet may be uniquely identified by its 7-tuple. According to an aspect of the disclosure, the 7-tuple illustrated in FIG. 4 may be a reference plurality of fields, e.g., the second plurality of fields.

In some aspects of the disclosure, the Destination Connection ID 412 and the Source Connection ID 414 illustrated in FIG. 4 may be collectively referred to as the Connection ID. In other words, in some aspects of the disclosure, an information field of a header that indicates a Connection ID may include at least one of a field that indicates a source Connection ID, such as Source Connection ID 414 illustrated in FIG. 4, and/or a field that indicates a destination Connection ID, such as Destination Connection ID 412 illustrated in FIG. 4.

In other aspects of the disclosure, a field indicating a Connection ID may include only one of either a Source Connection ID or a Destination Connection ID. To illustrate, FIG. 5, as an example, shows another diagram that illustrates a plurality of information fields of a data packet header according to some aspects of the present disclosure. In the example illustrated in FIG. 5, the plurality of information fields 500 that uniquely identify a data packet may include separate fields to indicate a Source IP address 502, a Destination IP address 504, a Source Port 506, a Destination Port 508, a Protocol Identification (ID) 510, and a Destination Connection ID 512. In another aspect of the disclosure, the Destination Connection ID 512 illustrated in FIG. 5 may be replaced with a Source Connection ID while the remaining information fields illustrated in FIG. 5 remain the same. As shown in the example illustrated in FIG. 5, the plurality of information fields 500 that uniquely identify a data packet may include six information fields. In some aspects of the disclosure, the six information fields 500 may be referred to as a 6-tuple. Thus, in some aspects of the disclosure, a data packet may be uniquely identified by its 6-tuple. According to an aspect of the disclosure, the 6-tuple illustrated in FIG. 5 may be a reference plurality of fields, e.g., the second plurality of fields.

Figure 5:
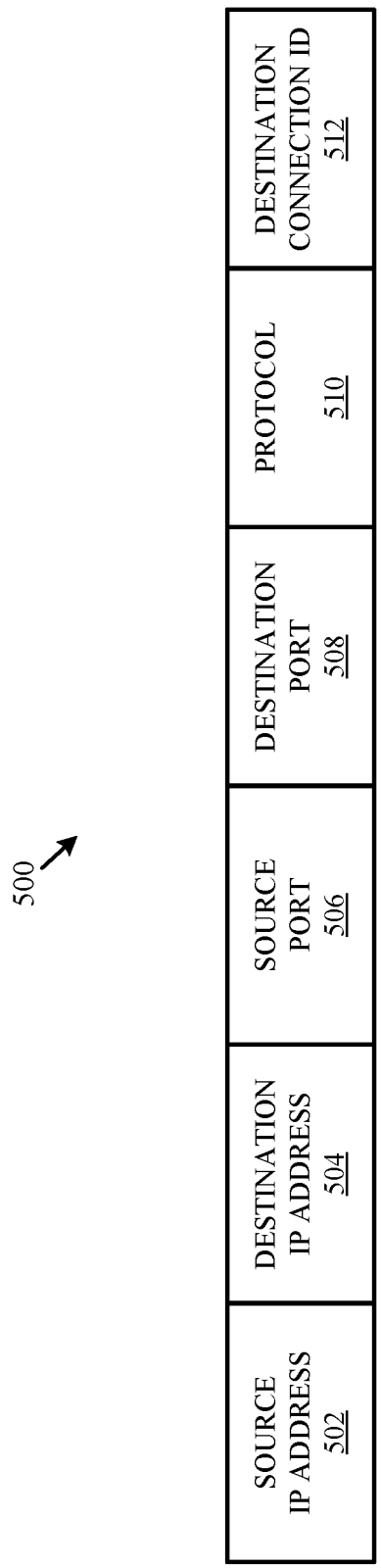
FIG. 5 shows another diagram that illustrates a plurality of fields of a data packet header according to some aspects of the present disclosure.

In summary, FIGS. 4 and 5 illustrate two different forms that may be taken by a reference plurality of fields, e.g., the second plurality of fields. For example, as illustrated in the example of FIG. 4, the second plurality of information fields may include separate fields to indicate a Source IP 402, a Destination IP 404, a Source Port 406, a Destination Port 408, a Protocol ID 410, and a Connection ID that includes both a Destination Connection ID 412 and a Source Connection ID 414. As another example, as illustrated in the example of FIG. 5, the second plurality of information fields may include separate fields to indicate a Source IP 502, a Destination IP 504, a Source Port 506, a Destination Port 508, a Protocol ID 510, and a Connection ID that is either a Destination Connection ID 512 as illustrated in FIG. 5 or, in the alternative, a Source Connection ID. Accordingly, in various aspects of the disclosure, the Connection ID present in the second plurality of information fields may include at least one of a field that indicates a source Connection ID and/or a field that indicates a destination Connection ID.

In some aspects of the disclosure, a reference plurality of fields may be a Traffic Flow Template (TFT). For example, in some aspects of the disclosure, a 7-tuple reference plurality of fields, such as the 7-tuple 400 illustrated in FIG. 4, may be part of a TFT. Similarly, in another aspect of the disclosure, a 6-tuple reference plurality of fields, such as the 6-tuple 500 illustrated in FIG. 5, may be part of a TFT. Thus, a TFT, like a reference plurality of fields, may refer to information fields of a header that uniquely identify a data packet or group of data packets. According to some aspects of the disclosure, a data packet, or group of data packets, may be uniquely identified by a TFT to determine the appropriate QoS parameters to use for the transmission scheduling of the data packet or group of packets, as detailed in this disclosure.

In some aspects of the disclosure, the same source and destination ports may be associated with multiple QUIC streams. For example, in one aspect of the disclosure, a first value of the Source Port field associated with the received/obtained data packet may be the same as a second value of another Source Port field associated with another data packet also being scheduled for transmission by the wireless communication device. In another aspect of the disclosure, a first value of the Destination Port field associated with the received/obtained data packet may be the same as a second value of another Destination Port field associated with another data packet also being scheduled for transmission by the wireless communication device. Thus, in some aspects of the disclosure, a first value of at least one of the field indicating the Source Port and/or the field indicating the Destination Port may be the same as a second value of at least one of another field indicating another Source Port and/or another field indicating another Destination Port included in another header of another data packet also being scheduled for transmission by the wireless communication device.

According to some aspects of the disclosure, the first plurality of fields mentioned at block 302 of method 300 may refer to the specific information fields of the header that uniquely identify the data packet received/obtained by the wireless communication device, such as at block 302 of method 300.

Determining whether the first plurality of fields associated with the received/obtained data packet match the second plurality of fields may be performed in a variety of ways. For example, in one aspect of the disclosure, a wireless communication device may attempt to match the first plurality of fields to the second plurality of fields 400 illustrated in FIG. 4. As an example, the wireless communication device may determine whether the first plurality of fields match the second plurality of fields by determining whether the first plurality of fields includes the 7-tuple. In other words, in one aspect of the disclosure, the wireless communication device may determine whether the first plurality of fields match the second plurality of fields by determining whether the first plurality of fields includes separate fields to indicate a Source IP 402, a Destination IP 404, a Source Port 406, a Destination Port 408, a Protocol ID 410, and a Connection ID that includes both a Destination Connection ID 412 and a Source Connection ID 414, as illustrated in FIG. 4. In some aspects of the disclosure, when the wireless communication device determines that the first plurality of fields includes the second plurality of fields 400 illustrated in FIG. 4, the wireless communication device may determine that there is a match.

In another aspect of the disclosure, a wireless communication device may attempt to match the first plurality of fields to the second plurality of fields 500 illustrated in FIG. 5. As an example, the wireless communication device may determine whether the first plurality of fields match the second plurality of fields by determining whether the first plurality of fields includes separate fields to indicate a Source IP 502, a Destination IP 504, a Source Port 506, a Destination Port 508, a Protocol ID 510, and a Connection ID, as illustrated in FIG. 5. The Connection ID may be a Destination Connection ID 512, as illustrated in FIG. 5, or, in the alternative, a Source Connection ID. In some aspects of the disclosure, when the wireless communication device determines that the first plurality of fields includes the second plurality of fields 500 illustrated in FIG. 5, the wireless communication device may determine that there is a match.

In some aspects of the disclosure, a wireless communication device may determine that the received/obtained data packet is compliant with a QUIC transport protocol. Compliance determinations may include a range of options related to matching data fields. In some aspects, compliance with the QUIC transport protocol may be determined when the first plurality of fields match the second plurality of fields. Match may mean that one or more data fields contain the same contents or portions of interest of the data fields contain the same contents. Match may also mean that one or more data or information fields are included in various data packets.

Continuing with method 300, at block 304, method 300 includes scheduling transmission of the data packet based on QoS parameters associated with the first plurality of fields. In some aspects of the disclosure, the transmission of the data packet may be scheduled based on QoS parameters associated with the first plurality of fields when the first plurality of fields match a reference plurality of fields, e.g., the second plurality of fields. As an example, base station 105 may, under control of controller/processor 240, schedule transmission of the data packet based on QoS parameters associated with the first plurality of fields when the first plurality of fields match the second plurality of fields. With specific reference to FIG. 2, in some aspects of the disclosure, a means for scheduling transmission of the data packet based on QoS parameters associated with the first plurality of fields when the first plurality of fields match the second plurality of fields may include the base station 105, and more specifically the components of the base station 105, such as, for example, controller/processor 240 and components of the base station 105 that are controlled/directed by controller/processor 240 to cause the base station 105 to scheduling transmission of the data packet based on QoS parameters associated with the first plurality of fields when the first plurality of fields match the second plurality of fields. As another example, UE 115 may, under control of controller/processor 280, schedule transmission of the data packet based on QoS parameters associated with the first plurality of fields when the first plurality of fields match the second plurality of fields. With specific reference to FIG. 2, in some aspects of the disclosure, a means for scheduling transmission of the data packet based on QoS parameters associated with the first plurality of fields when the first plurality of fields match the second plurality of fields may include the UE 115, and more specifically the components of the UE 115, such as, for example, controller/processor 280 and components of the UE 115 that are controlled/directed by controller/processor 280 to cause the UE 115 to schedule transmission of the data packet based on QoS parameters associated with the first plurality of fields when the first plurality of fields match the second plurality of fields.

In some aspects of the disclosure, the first plurality of fields, whether matching a second plurality of fields taking the form illustrated in FIG. 4 or FIG. 5, may be associated with a particular set of QoS parameters. Accordingly, in some aspects of the disclosure, when the wireless communication device determines that the first plurality of fields match the second plurality of fields, the wireless communication device may identify the specific QoS parameters associated with the particular first plurality of fields. As an example, after the wireless communication device determines that the first plurality of fields match the second plurality of fields, the wireless communication device may process the values of each of the information fields of the first plurality of fields to determine the specific values of the first plurality of fields. Based on the specific values of the information fields of the first plurality of fields, the wireless communication device may obtain the QoS parameters associated with that specific first plurality of fields. For example, in some aspects of the disclosure, the association between specific QoS parameters and specific values of the first plurality of fields may be stored in a memory of the wireless communication device. Thus, in one aspect of the disclosure, when the wireless communication device knows the specific values of the first plurality of fields, the wireless communication device may read, e.g., from memory, the stored associations between specific QoS parameters and specific values of the first plurality of fields to identify the specific QoS parameters associated with the specific values of the first plurality of fields. In some aspects of the disclosure, the QoS parameters associated with a specific first plurality of fields may also be referred to as QoS parameters associated with a specific second plurality of fields. This may be the case when the first plurality of fields match the second plurality of fields because in such a scenario the specific values of the first plurality of fields may be the same as the specific values of the second plurality of fields, e.g., the specific reference plurality of fields or 7-tuple TFT.

In some aspects of the disclosure, the wireless communication device may schedule transmission of the received/obtained data packet based on the specific QoS parameters associated with the specific values of the first plurality of fields, such as at block 304. For example, as described previously, some QoS parameters may specify data rate, delay, delay variation, packet loss, and/or BER thresholds, acceptable values, and/or acceptable ranges of values for a data packet. Thus, in some aspects of the disclosure, scheduling transmission of the data packet based on QoS parameters associated with the first plurality of fields, such as at block 304, may include taking into account the thresholds, acceptable values, and/or acceptable ranges of values provided for the various QoS parameters when scheduling transmission of the data packet.

According to some aspects of the disclosure, a wireless communication device may also transmit the data packet based, at least in part, on the scheduling. For example, the wireless communication device may transmit the data packet having the header that includes the first plurality of fields based, at least in part, on the scheduling, such as the scheduling of block 304 of method 300. In some aspects of the disclosure, another wireless communication device receiving the data packet may use the first plurality of fields within the header of the received data packet to receive and/or process the data packet.

A wireless communication device may transmit data packets in a variety ways. For example, in one aspect of the disclosure, the wireless communication device may transmit the data packet having the header that includes the first plurality of fields from a first component of the wireless communication device to another component of the wireless communication device, e.g., a component on which an application is running within the wireless communication device. Thus, in some aspects of the disclosure, transmission of data packets by the wireless communication device may include transmission that occurs within the wireless communication device, e.g., from a first component of the wireless communication device to another component of the wireless communication device.

In another aspect of the disclosure, the wireless communication device may transmit the data packet to another wireless communication device. For example, in one aspect of the disclosure, a first wireless communication device may transmit a data packet having a header that includes a first plurality of fields. Then a second wireless communication device may receive the transmitted data packet having the header that includes the first plurality of fields. Thus, in some aspects of the disclosure, transmission of data packets by the wireless communication device may include transmission that occurs from one or more wireless communication devices to another one or more wireless communication devices.

In other aspects of the disclosure, a first plurality of fields received by another wireless communication device may be used by the other wireless communication device to perform reflective QoS-based transmission scheduling of data packets to be transmitted. For example, the other wireless communication device may receive/obtain another data packet having another header that includes a reflected version of the first plurality of fields received from the wireless communication device. As an example, if the other wireless communication device received from the wireless communication device a data packet having the 7-tuple <Source IP, Destination IP, Source Port, Destination Port, Protocol ID, Source Connection ID, Destination Connection ID>, then another data packet that the other wireless communication device may be scheduling for transmission may have the 7-tuple <Destination IP, Source IP, Destination Port, Source Port, Protocol ID, Destination Connection ID, Source Connection ID>. As is apparent, the 7-tuple of the other data packet is a reflected version of the 7-tuple of the originally-received data packet because each of the "Source" fields and "Destination" fields are reflected, e.g., switched. In some aspects, only the Protocol ID field may not be reflected.

In some aspects of the disclosure, the other wireless communication device may perform various aspects of method 300 to perform reflective QoS-based transmission scheduling of data packets. For example, the other wireless communication device may receive/obtain another data packet having a header that includes a reflected version of the first plurality of fields received from the wireless communication device. Additionally, the other wireless communication device may schedule transmission of the other data packet based on QoS parameters associated with the reflected version of the first plurality of fields.

Reflective QoS-based transmission scheduling of data packets by a wireless communication device may include various aspects of method 300. For example, in one aspect of the disclosure, a wireless communication device may receive another data packet having another header that includes a third plurality of fields. According to some aspects of the disclosure, the third plurality of fields may refer to the specific information fields of the other header that uniquely identify the other data packet received/obtained by the wireless communication device, such as at block 302 of method 300. In another aspect of the disclosure, the wireless communication device that received the other data packet may schedule transmission of the other data packet based on QoS parameters associated with the third plurality of fields, such as at block 304 of method 300. According to some aspects of the disclosure, the transmission of the other data packet may be scheduled based on QoS parameters associated with the third plurality of fields when the third plurality of fields match another reference plurality of fields, e.g., a fourth plurality of fields. For example, when reflective QoS-based transmission scheduling of data packets is performed by the wireless communication device, the Source IP, Destination IP, Source Port, Destination Port, Protocol ID, Source Connection ID, and Destination Connection ID fields of the fourth plurality of fields may correspond to the Destination IP, Source IP, Destination Port, Source Port, Protocol ID, Destination Connection ID, and Source Connection ID fields, respectively, of the second plurality of fields.

In some aspects, QoS techniques for QUIC streams may include a wireless communication device receiving a data packet having a header that includes a first plurality of fields. QoS techniques for QUIC streams may also include a wireless communication device scheduling transmission of the data packet based on QoS parameters associated with the first plurality of fields. The transmission of the data packet may be scheduled based on QoS parameters associated with the first plurality of fields when the first plurality of fields match a second plurality of fields.

QoS techniques for QUIC streams may include additional aspects, such as any single aspect or any combination of aspects described below and/or in connection with one or more other processes described elsewhere herein.

In a first aspect, the second plurality of fields comprises separate fields to indicate a Source IP, a Destination IP, a Source Port, a Destination Port, a Protocol ID, and a Connection ID.

In a second aspect, alone or in combination with the first aspect, the field that indicates the Connection ID includes at least one of a field that indicates a Source Connection ID and/or a field that indicates a Destination Connection ID.

In a third aspect, alone or in combination with one or more of the first and second aspects, a wireless communication device may receive another data packet having another header that includes a third plurality of fields.

In a fourth aspect, alone or in combination with one or more of the first through third aspects, a wireless communication device may schedule transmission of the another data packet based on QoS parameters associated with the third plurality of fields when the third plurality of fields match a fourth plurality of fields.

In a fifth aspect, alone or in combination with one or more of the first through fourth aspects, the Source IP, Destination IP, Source Port, Destination Port, Protocol ID, Source Connection ID, and Destination Connection ID fields of the fourth plurality of fields may correspond to the Destination IP, Source IP, Destination Port, Source Port, Protocol ID, Destination Connection ID, and Source Connection ID fields, respectively, of the second plurality of fields.

In a sixth aspect, alone or in combination with one or more of the first through fifth aspects, a first value of at least one of the field indicating the Source Port and/or the field indicating the Destination Port may be the same as a second value of at least one of another field indicating another Source Port and/or another field indicating another Destination Port included in another header of another data packet also being scheduled for transmission.

In a seventh aspect, alone or in combination with one or more of the first through sixth aspects, a wireless communication device may determine that the data packet is compliant with a QUIC transport protocol when the first plurality of fields match the second plurality of fields.

In an eighth aspect, alone or in combination with one or more of the first through seventh aspects, a content provider may cause a data packet having a header that includes a first plurality of fields to be received by a wireless communication device.

In a ninth aspect, alone or in combination with one or more of the first through eighth aspects, a content provider may cause a wireless communication device to schedule transmission of the data packet based on QoS parameters associated with the first plurality of fields when the first plurality of fields match a second plurality of fields.

In a tenth aspect, alone or in combination with one or more of the first through ninth aspects, a content provider may cause another data packet having another header that includes a third plurality of fields to be received by a wireless communication device.

In an eleventh aspect, alone or in combination with one or more of the first through tenth aspects, a content provider may cause a wireless communication device to schedule transmission of the another data packet based on QoS parameters associated with the third plurality of fields when the third plurality of fields match a fourth plurality of fields.

In a twelfth aspect, alone or in combination with one or more of the first through eleventh aspects, a content provider may cause a wireless communication device to determine that the data packet is compliant with a QUIC transport protocol when the first plurality of fields match the second plurality of fields.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise a variety of components and structures. These may include one or more of processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof. These items can be utilized as one or more means for carrying out any one or more of the described functions and means discussed herein.

Those of skill would further appreciate that the various illustrative logical blocks, modules, circuits, and algorithm processing (e.g., the logical blocks in FIG. 3) described in connection with the disclosure herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Features of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
  receiving a data packet having a header that includes a first plurality of fields; and in response to a match between the first plurality of fields and a second plurality of fields that includes each of a Source Internet Protocol (IP) field, a Destination IP field, a Source Port field, a Destination Port field, a Protocol Identification (ID) field, and one or more Connection ID fields:
- identifying quality-of-service (QoS) parameters that correspond to values of the first plurality of fields from multiple QoS parameters corresponding to multiple values; and
- scheduling transmission of the data packet based on the QoS parameters.

2. The method of claim 1, wherein the second plurality of fields are sequentially ordered in the header according to the following sequence: the Source IP field, the Destination IP field, the Source Port field, the Destination Port field, the Protocol ID field, and the one or more Connection ID fields.

3. The method of claim 1, wherein the match corresponds to each field type of the first plurality of fields matching a field type of a counterpart field of the second plurality of fields.

4. The method of claim 1, further comprising:
- receiving another data packet having another header that includes a third plurality of fields; and
- scheduling transmission of the another data packet based on QoS parameters associated with the third plurality of fields based on the third plurality of fields matching a fourth plurality of fields, wherein, for the fourth plurality of fields, a Source IP field, a Destination IP field, a Source Port field, a Destination Port field, a Protocol ID field, a Source Connection ID field of one or more Connection ID fields, and a Destination Connection ID field of the one or more Connection ID fields correspond to the Destination IP field, the Source IP field, the Destination Port field, the Source Port field, the Protocol ID field, a Destination Connection ID field of the one or more Connection ID fields, and a Source Connection ID field of the one or more Connection ID fields, respectively, of the second plurality of fields.

5. The method of claim 1, wherein a first value of at least one of the Source Port field and/or the Destination Port field of the first plurality of fields is the same as a second value of at least one of another Source Port field and/or another Destination Port field included in another header of another data packet also being scheduled for transmission.

6. The method of claim 1, wherein identifying the QoS parameters that correspond to the values of the first plurality of fields from the multiple QoS parameters corresponding to the multiple values comprises:
- reading, from a memory, one or more associations between the values of the first plurality of fields and at least some of the multiple QoS parameters.

7. The method of claim 1, wherein the method further comprises, in response to the match between the first plurality of fields and the second plurality of fields:
- processing the first plurality of fields to determine the values of the first plurality of fields.

8. An apparatus configured for wireless communication, comprising:
- means for receiving a data packet having a header that includes a first plurality of fields; and
- means for scheduling, in response to a match between the first plurality of fields and a second plurality of fields that includes each of a Source Internet Protocol (IP) field, a Destination IP field, a Source Port field, a Destination Port field, a Protocol Identification (ID) field, and one or more Connection ID fields, transmission of the data packet based on quality-of-service (QoS) parameters that correspond to values of the first plurality of fields the QoS parameters identified from multiple QoS parameters corresponding to multiple values.

9. The apparatus of claim 8, wherein the second plurality of fields are sequentially ordered in the header according to the following sequence: the Source IP field, the Destination IP field, the Source Port field, the Destination Port field, the Protocol ID field, and the one or more Connection ID fields.

10. The apparatus of claim 8, further comprising:
- means for receiving another data packet having another header that includes a third plurality of fields; and
- means for scheduling transmission of the another data packet based on QoS parameters associated with the third plurality of fields based on the third plurality of fields matching a fourth plurality of fields, wherein, for the fourth plurality of fields, a Source IP field, a Destination IP field, a Source Port field, a Destination Port field, a Protocol ID field, a Source Connection ID filed of one or more Connection ID fields, and a Destination Connection ID field of the one or more Connection ID fields correspond to the Destination IP field, the Source IP field, the Destination Port field, the Source Port field, the Protocol ID field, a Destination Connection ID field of the one or more Connection ID fields, and a Source Connection ID field of the one or more Connection ID fields, respectively, of the second plurality of fields.

11. The apparatus of claim 8, wherein a first value of at least one of the Source Port field and/or the Destination Port field of the first plurality of fields is the same as a second value of at least one of another Source Port field and/or another Destination Port field included in another header of another data packet also being scheduled for transmission.

12. The apparatus of claim 8, further comprising means for determining that the data packet is compliant with a QUIC transport protocol when the first plurality of fields match the second plurality of fields.

13. A non-transitory computer-readable medium having program code recorded thereon, the program code comprising:
- program code executable by a computer for causing the computer to receive a data packet having a header that includes a first plurality of fields; and
- program code executable by the computer for causing the computer to, in response to a match between the first plurality of fields and a second plurality of fields that includes each of a Source Internet Protocol (IP) field, a Destination IP field, a Source Port field, a Destination Port field, a Protocol Identification (ID) field, and one or more Connection ID fields:
  - identify quality-of-service (QoS) parameters that correspond to values of the first plurality of fields from multiple QoS parameters corresponding to multiple values; and
  - schedule transmission of the data packet based on the QoS parameters.

14. The non-transitory computer-readable medium of claim 13, wherein the second plurality of fields are sequentially ordered in the header according to the following sequence: the Source IP field, the Destination IP field, the Source Port field, the Destination Port field, the Protocol ID field, and the one or more Connection ID fields.

15. The non-transitory computer-readable medium of claim 13, wherein the one or more Connection ID fields include a Source Connection ID field and a Destination Connection ID field.

16. The non-transitory computer-readable medium of claim 13, further comprising:
program code executable by the computer for causing the computer to receive another data packet having another header that includes a third plurality of fields; and
program code executable by the computer for causing the computer to schedule transmission of the another data packet based on QoS parameters associated with the third plurality of fields based on the third plurality of fields matching a fourth plurality of fields, wherein, for the fourth plurality of fields, a Source IP field, a Destination IP field, a Source Port field, a Destination Port field, a Protocol ID field, a Source Connection ID field of one or more Connection ID fields, and a Destination Connection ID field of the one or more fields correspond to the Destination IP field, the Source IP field, the Destination Port field, the Source Port field, the Protocol ID field, a Destination Connection ID field of the one or more Connection ID fields, and a Source Connection ID field of the one or more Connection ID fields, respectively, of the second plurality of fields.

17. The non-transitory computer-readable medium of claim 13, wherein a first value of at least one of the Source Port field and/or the Destination Port field of the first plurality of fields is the same as a second value of at least one of another Source Port field and/or another Destination Port field included in another header of another data packet also being scheduled for transmission.

18. The non-transitory computer-readable medium of claim 13, further comprising program code executable by the computer for causing the computer to determine that the data packet is compliant with a QUIC transport protocol when the first plurality of fields match the second plurality of fields.

19. An apparatus configured for wireless communication, the apparatus comprising:
at least one processor; and
a memory coupled to the at least one processor, wherein the at least one processor is configured to:
receive a data packet having a header that includes a first plurality of fields;
in response to a match between the first plurality of fields-and a second plurality of fields that includes each of a Source Internet Protocol (IP) field, a Destination IP field, a Source Port field, a Destination Port field, a Protocol Identification (ID) field, and one or more Connection ID fields:
identify quality-of-service (QoS) parameters that correspond to values of the first plurality of fields from multiple QoS parameters corresponding to multiple values; and
schedule transmission of the data packet based on the QoS parameters.

20. The apparatus of claim 19, wherein the second plurality of fields are sequentially ordered in the header according to the following sequence: the Source IP field, the Destination IP field, the Source Port field, the Destination Port field, the Protocol ID field, and the one or more Connection ID fields.

21. The apparatus of claim 19, wherein the one or more Connection ID fields include a Source Connection ID field and a Destination Connection ID field.

22. The apparatus of claim 19, wherein the at least one processor is further configured to:
receive another data packet having another header that includes a third plurality of fields; and
schedule transmission of the another data packet based on QoS parameters associated with the third plurality of fields based on the third plurality of fields matching a fourth plurality of fields, wherein, for the fourth plurality of fields, a Source IP field, a Destination IP field, a Source Port field, a Destination Port field, a Protocol ID field, a Source Connection ID field of one or more Connection ID fields, and a Destination Connection ID field of the one or more Connection ID fields correspond to the Destination IP field, the Source IP field, the Destination Port field, the Source Port field, the Protocol ID field, a Destination Connection ID field of the one or more Connection ID fields, and a Source Connection ID field of the one or more Connection ID fields, respectively, of the second plurality of fields.

23. The apparatus of claim 19, wherein a first value of at least one of the Source Port field and/or the Destination Port field of the first plurality of fields is the same as a second value of at least one of another Source Port field and/or another Destination Port field included in another header of another data packet also being scheduled for transmission.

24. The apparatus of claim 19, wherein the at least one processor is further configured to determine that the data packet is compliant with a QUIC transport protocol when the first plurality of fields match the second plurality of fields.

* * * * *